US012580461B2

(12) United States Patent
Yazaki et al.

(10) Patent No.: US 12,580,461 B2
(45) Date of Patent: Mar. 17, 2026

(54) ROTATING ELECTRIC MACHINE SYSTEM AND COMBINED POWER SYSTEM

(71) Applicant: HONDA MOTOR CO., LTD., Tokyo (JP)

(72) Inventors: Manabu Yazaki, Wako (JP); Tatsuya Choji, Wako (JP); Tsubasa Nakatomi, Wako (JP); Kenichi Senda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/018,191

(22) Filed: Jan. 13, 2025

(65) Prior Publication Data

US 2025/0246979 A1 Jul. 31, 2025

(30) Foreign Application Priority Data

Jan. 31, 2024 (JP) .................................. 2024-012770

(51) Int. Cl.
| | |
|---|---|
| *H02K 11/40* | (2016.01) |
| *F02C 6/00* | (2006.01) |
| *H02K 5/24* | (2006.01) |
| *H02K 7/08* | (2006.01) |
| *H02K 7/18* | (2006.01) |
| *H02K 11/05* | (2016.01) |
| *H02K 21/14* | (2006.01) |
| *H02K 24/00* | (2006.01) |

(52) U.S. Cl.
CPC .................. *H02K 11/40* (2016.01); *F02C 6/00* (2013.01); *H02K 5/24* (2013.01); *H02K 7/083* (2013.01); *H02K 7/1823* (2013.01); *H02K 11/05* (2016.01); *H02K 21/14* (2013.01); *H02K 24/00* (2013.01); *F05D 2220/76* (2013.01)

(58) Field of Classification Search
CPC .......... H02K 11/40; H02K 5/24; H02K 7/083; H02K 7/1823; H02K 11/05; H02K 21/14; H02K 24/00; F02C 6/00; F05D 2220/76
USPC ............................................. 290/52; 310/40 R
See application file for complete search history.

(56) References Cited

U.S. PATENT DOCUMENTS

| | | | | |
|---|---|---|---|---|
| 787,184 | A | * | 4/1905 | Jacobson .................. H02K 1/17 |
| | | | | 310/70 R |
| 1,805,935 | A | * | 5/1931 | Weathers ............... H02K 47/14 |
| | | | | 310/237 |
| 11,634,997 | B2 | * | 4/2023 | Yazaki .................... F01D 25/16 |
| | | | | 290/52 |

(Continued)

FOREIGN PATENT DOCUMENTS

EP 4116191 A1 * 1/2023 ......... B64C 29/0033

*Primary Examiner* — Charles Reid, Jr.
(74) *Attorney, Agent, or Firm* — Rankin, Hill & Clark LLP

(57) ABSTRACT

A combined power system includes a rotating electric machine system. The rotating electric machine system includes a rotating electric machine and a rotating electric machine housing. A first retaining member and a second retaining member are provided on an outer circumferential portion of the rotating electric machine housing in order to retain the rotating electric machine housing by a support member provided in a structural body in which the rotating electric machine system is installed. An electrical component is disposed at a position on the outer circumferential portion of the rotating electric machine housing, and the position is separated from the portion between the first retaining member and the second retaining member.

13 Claims, 6 Drawing Sheets

(56) References Cited

U.S. PATENT DOCUMENTS

| | | | | |
|---|---|---|---|---|
| 11,637,475 B2 * | 4/2023 | Lemmers, Jr. | .......... | F01D 25/30 |
| | | | | 290/52 |
| 11,732,605 B2 * | 8/2023 | Yazaki | .................. | H02K 7/083 |
| | | | | 290/52 |
| 11,787,275 B2 * | 10/2023 | Watt | ......................... | B60K 1/00 |
| | | | | 60/419 |
| 2022/0316354 A1 * | 10/2022 | Yazaki | .................. | H02K 5/203 |
| 2023/0265788 A1 * | 8/2023 | Yazaki | ................. | F02B 63/042 |
| | | | | 310/40 R |

* cited by examiner

10

ROTATING ELECTRIC MACHINE SYSTEM AND COMBINED POWER SYSTEM

CROSS-REFERENCE TO RELATED APPLICATIONS

This application is based upon and claims the benefit of priority from Japanese Patent Application No. 2024-012770 filed on Jan. 31, 2024, the contents of which are incorporated herein by reference.

BACKGROUND OF THE INVENTION

Field of the Invention

The present disclosure relates to a rotating electric machine system and a combined power system.

Description of the Related Art

In recent years, research and development have been conducted on various fields including rotating electric machines that contribute to energy efficiency in order to ensure that more people have access to affordable, reliable, sustainable and modern energy. As shown in EP 4116191 A1, a rotating electric machine system is known. In EP 4116191 A1, a combined power system including a rotating electric machine system and an internal combustion engine is mounted on the fuselage of an aircraft.

SUMMARY OF THE INVENTION

When the equipment in which the rotating electric machine system is installed is struck by lightning, there is a possibility that a current flows into the rotating electric machine system through the stays supporting the rotating electric machine system. In this case, it is required to protect the electrical components mounted on the rotating electric machine system.

The present invention has the object of solving the aforementioned problem.

A first aspect of the present disclosure is a rotating electric machine system equipped with a rotating electric machine provided with a rotor, the rotor including a permanent magnet and a rotating shaft, and a rotating electric machine housing configured to rotatably support the rotating shaft. The rotating electric machine system includes an electrical component provided at the rotating electric machine housing, and a first retaining member and a second retaining member provided on an outer circumferential portion of the rotating electric machine housing and configured to retain the rotating electric machine housing by a support member provided in a structural body to which the rotating electric machine system is installed, wherein the first retaining member and the second retaining member are arranged at positions spaced from each other in a circumferential direction of the rotating electric machine housing, and the electrical component is disposed at a position away from a portion between the first retaining member and the second retaining member in the outer circumferential portion.

A second aspect of the present disclosure is a combined power system equipped with the rotating electric machine system described in the first aspect, and an internal combustion engine including a combustor and an output shaft that is configured to rotate integrally together with the rotating shaft. The combined power system includes a plurality of third retaining members provided at intervals on an outer circumferential portion of the internal combustion engine and configured to retain the internal combustion engine by another support member provided in the structural body, wherein the plurality of third retaining members are provided at positions shifted from the combustor in an axial direction of the internal combustion engine.

According to the present disclosure, even when the structural body in which the rotating electric machine system is installed is struck by lightning and a part of the current flows to the rotating electric machine system, the current flows to a portion away from the electrical component, so that the electrical component can be prevented from being damaged.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

In the following description, it is assumed that a combined power system 10 is installed in a structural body 100 for installing the combined power system 10 (FIGS. 4 and 5), in the direction shown in FIGS. 1 to 6. That is, upper and lower directions in FIGS. 1 to 6 are vertical upper and vertical lower directions, respectively.

Figure 1:
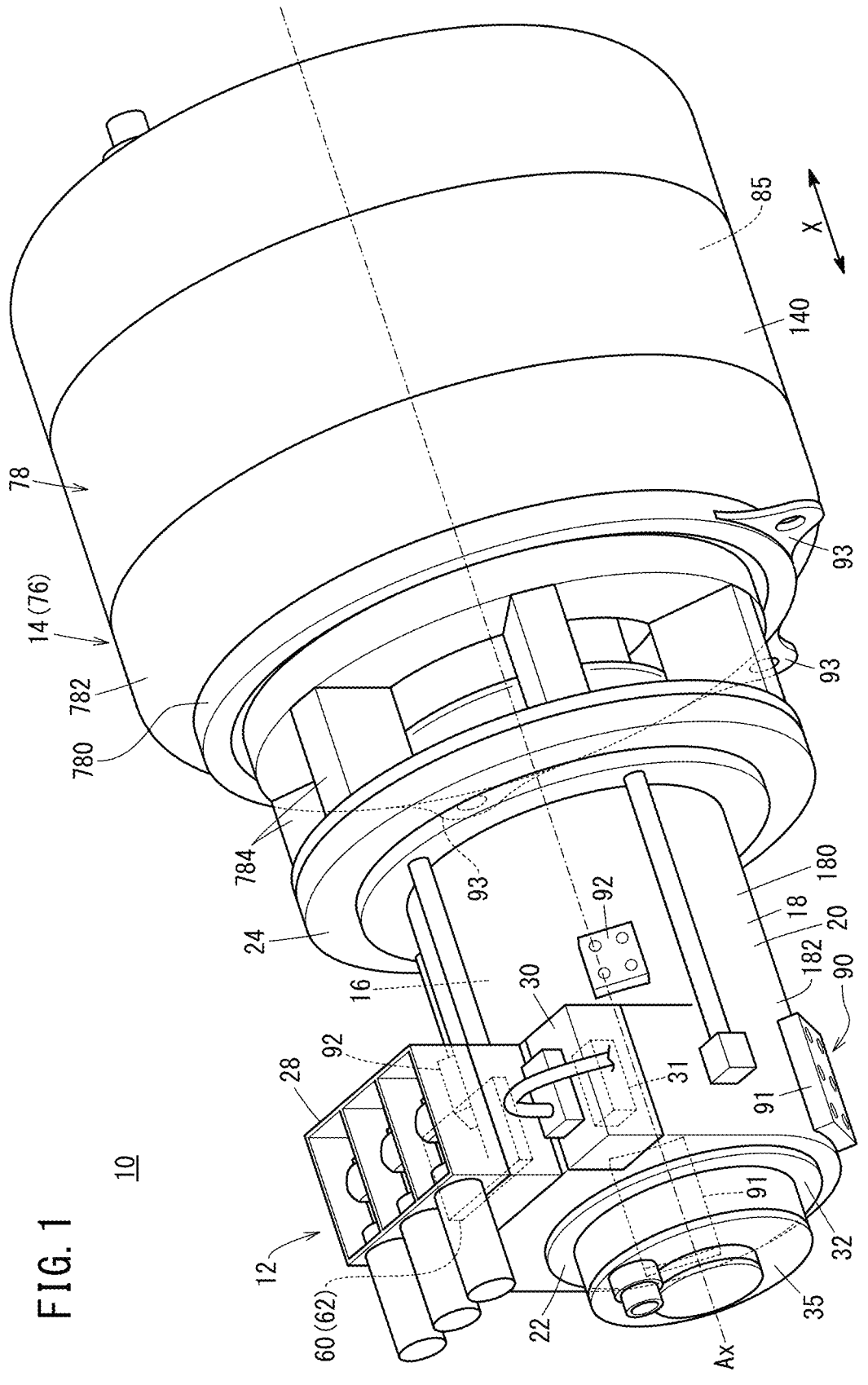
FIG. 1 is a perspective view of a combined power system according to an embodiment of the present invention.

The combined power system 10 shown in FIG. 1 is used, for example, as a power source for providing propulsion in a mobile body. Examples of the mobile body on which the combined power system 10 is mounted include a flying object, a ship, an automobile, and the like. Suitable specific examples of the flying object include a drone and a multicopter. The combined power system 10, when mounted on a flying object, is used as a power drive source for rotationally urging, for example, a prop, a ducted fan, or the like. The combined power system 10, when mounted on a ship, is used as a screw rotational force generating device. The combined power system 10, when mounted on an automobile, is used as a power drive source for rotating a motor.

The combined power system 10 can also be used as an auxiliary power source in an aircraft, a ship, a building, or the like. The combined power system 10 may also be installed in a stationary body. Such stationary bodies include a wall or a floor of a building of gas turbine power generation equipment.

The combined power system 10 includes a rotating electric machine system 12 and an internal combustion engine 14. An axis of the rotating electric machine system 12 coincides with an axis of the internal combustion engine 14. In other words, the rotating electric machine system 12 and the internal combustion engine 14 are arranged so as to be adjacent to each other on the same axis. Hereinafter, the axis of the rotating electric machine system 12 and the axis of the internal combustion engine 14 are collectively referred to as an "axis Ax". Also, an axis of the combined power system 10 is referred to as the "axis Ax".

Figure 2:
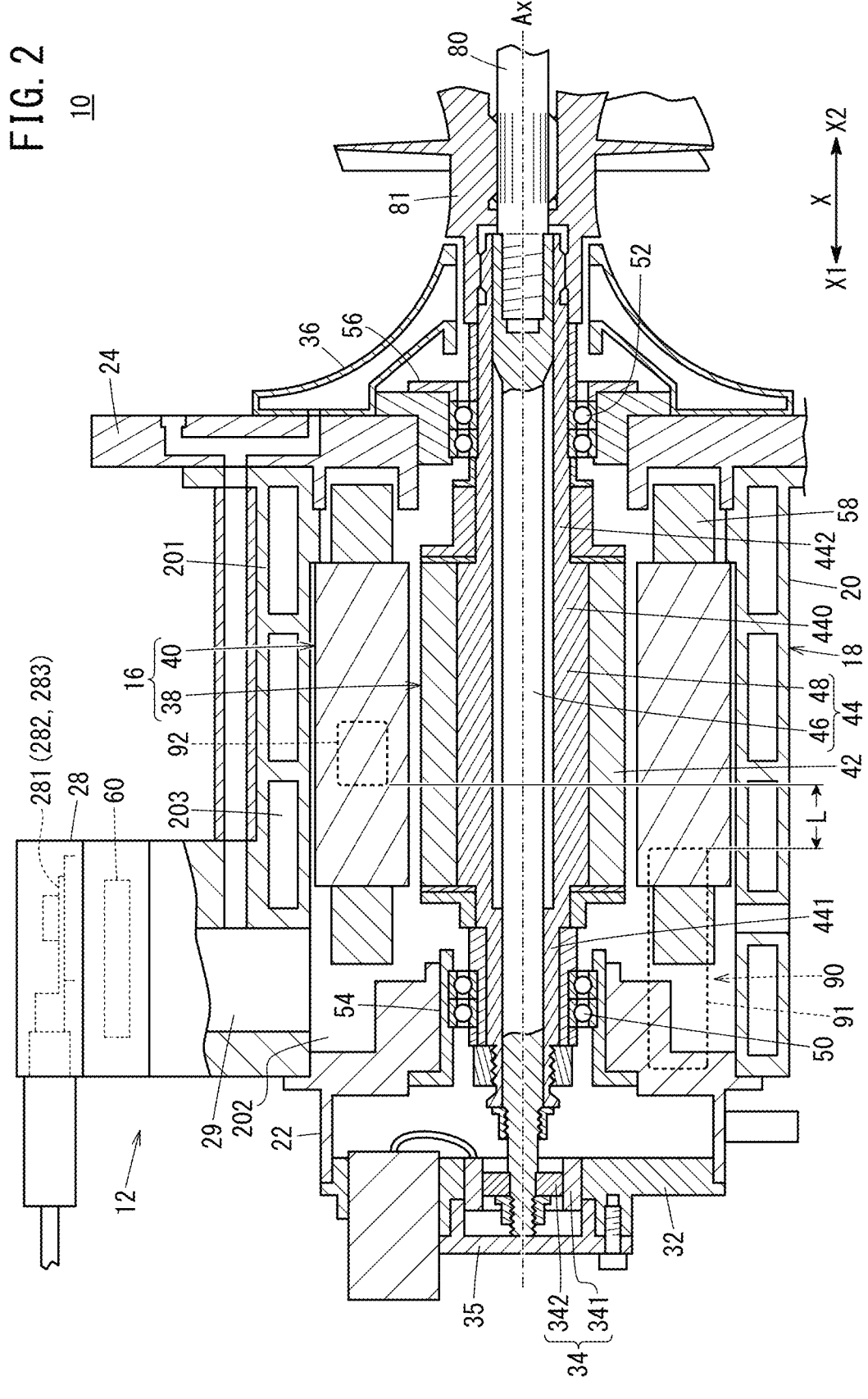
FIG. 2 is a cross-sectional view of the rotating electric machine system of the combined power system.

As shown in FIG. 2, the rotating electric machine system 12 includes a rotating electric machine 16 and a rotating electric machine housing 18.

The rotating electric machine housing 18 accommodates the rotating electric machine 16. The rotating electric machine housing 18 includes a main housing 20, a first sub-housing 22, and a second sub-housing 24. The main housing 20 has a substantially cylindrical shape with both ends thereof in the axial direction (X direction) being open. Hereinafter, one end of the main housing 20 in the axial direction is referred to as a "first end". The other end of the main housing 20 in the axial direction is referred to as a "second end".

The main housing 20 includes a circumferential wall 201 surrounding the rotating electric machine 16. A hollow interior part surrounded by the circumferential wall 201 of the main housing 20 is an accommodation chamber 202. The majority of the components of the rotating electric machine 16 are accommodated in the accommodation chamber 202.

A cooling jacket 203 is spirally formed on the circumferential wall 201 of the main housing 20. A coolant flows through the cooling jacket 203. As a specific example of the coolant, there may be cited cooling water. In this case, the cooling jacket 203 is a water jacket.

In FIG. 1, on an outer surface of the circumferential wall 201 of the main housing 20, in the vicinity of an edge of the first end, a terminal casing 28 and a measuring device casing 30 are disposed. That is, the terminal casing 28 and the measuring device casing 30 are disposed integrally with the main housing 20. The measuring device casing 30 is adjacent to the terminal casing 28. A thermistor 31, which serves as a temperature measuring device, is accommodated in the measuring device casing 30.

In FIG. 2, the terminal casing 28 has an internal space 29. The internal space 29 communicates with the accommodation chamber 202. In the terminal casing 28, a U-phase terminal 281, a V-phase terminal 282, and a W-phase terminal 283 are accommodated. The U-phase terminal 281, the V-phase terminal 282, and the W-phase terminal 283 are electric terminal portions to which an external device (an external load or an external power supply) is electrically connected.

Figure 3:
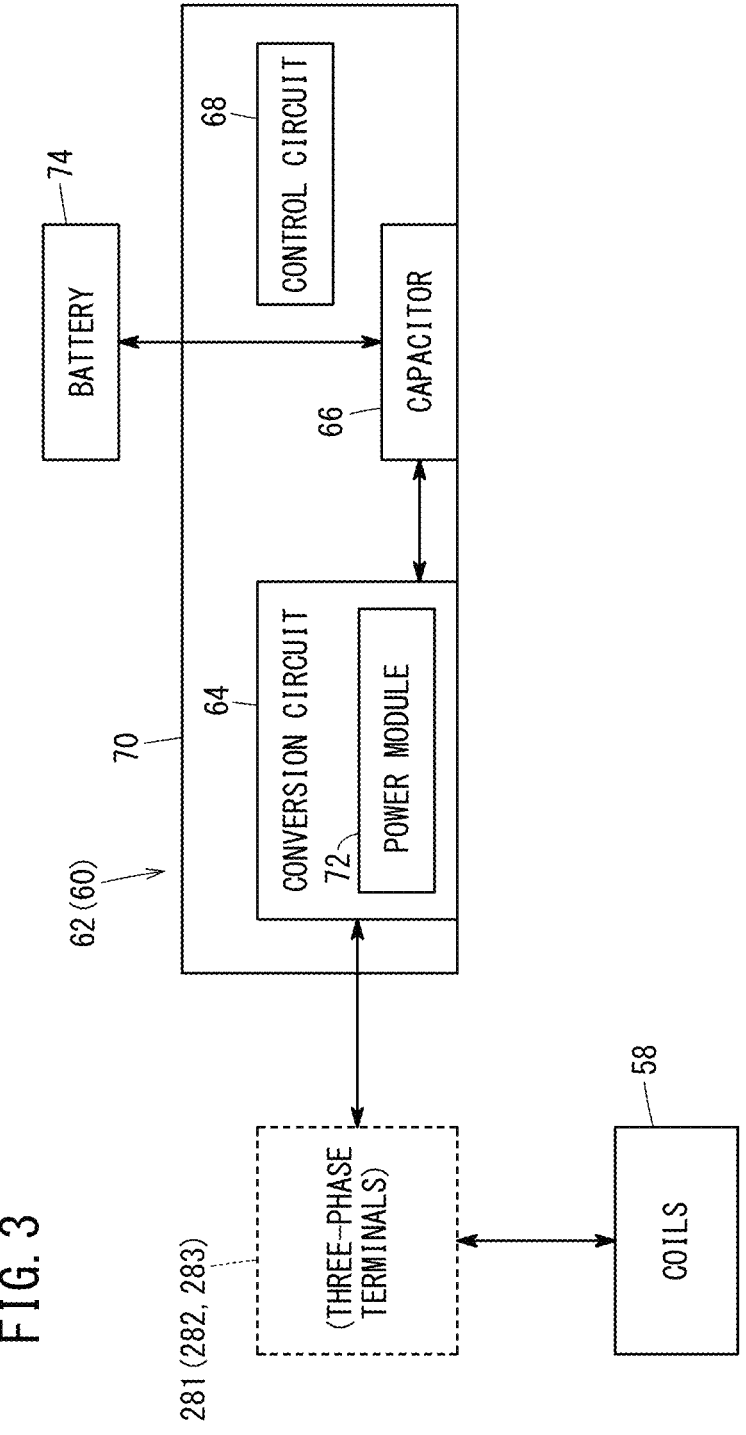
FIG. 3 is a schematic configuration diagram of a current converter.

Electric power generated by the rotating electric machine 16 is supplied to the external device. As an example of the external load, there may be cited a motor (not shown). As an example of another external device, there may be cited a battery 74 (FIG. 3).

The first sub-housing 22 is connected to the first end of the main housing 20. A resolver holder 32 is connected to the first sub-housing 22. The resolver holder 32 retains a resolver stator 341 of a resolver 34. The resolver 34 is a rotational parameter detector. A cap cover 35 is connected to the resolver holder 32.

The second sub-housing 24 is connected to the second end of the main housing 20. In the second sub-housing 24, a rectifying member 36 is connected to the end surface thereof that faces toward the internal combustion engine 14.

The rotating electric machine 16 is, for example, an electrical power generator. The rotating electric machine 16 may be an electric motor. The rotating electric machine 16 includes a rotor 38 and a stator 40. The rotor 38 includes permanent magnets 42 and a rotating shaft 44. The permanent magnets 42 are retained on the outer circumferential portion of the rotating shaft 44. In the following description, the axial direction of the rotor 38 is the same as the axial direction of the rotating electric machine system 12. For this reason, the axial direction of the rotor 38 or the axial direction of the rotating electric machine system 12 is sometimes simply referred to as the "axial direction".

The rotating shaft 44 has a large diameter portion 440, a first small diameter portion 441, and a second small diameter portion 442. The large diameter portion 440 supports the permanent magnets 42. The first small diameter portion 441 and the second small diameter portion 442 project from the large diameter portion 440 in directions opposite to each other in the axial direction of the rotor 38. Specifically, the first small diameter portion 441 projects axially from one end of the large diameter portion 440. The second small diameter portion 442 projects axially from the other end of the large diameter portion 440. The outer diameters of the first small diameter portion 441 and the second small diameter portion 442 are smaller than the outer diameter of the large diameter portion 440.

The rotating shaft 44 includes an inner shaft 46 and an outer shaft 48. The inner shaft 46 is inserted into the outer shaft 48. The inner shaft 46 is fixed to the outer shaft 48. The inner shaft 46 is longer than the outer shaft 48. One end of the inner shaft 46 projects from the outer shaft 48. A resolver rotor 342 of the resolver 34 is fixed to the one end of the inner shaft 46.

The outer shaft 48 has a hollow shape with both ends thereof in the axial direction being open. The permanent magnets 42 are retained on the outer circumferential portion of the outer shaft 48. The aforementioned large diameter portion 440, first small diameter portion 441, and second small diameter portion 442 are provided on the outer shaft 48.

The rotating shaft 44 is rotatably supported by the first sub-housing 22 via a first bearing 50 and a second bearing 52. The first bearing 50 is disposed between the rotating electric machine housing 18 and the first small diameter portion 441. The second bearing 52 is disposed between the rotating electric machine housing 18 and the second small diameter portion 442.

The first bearing 50 is disposed between the outer shaft 48 and the first sub-housing 22. A hollow first holder 54 is inserted into the first sub-housing 22. The first bearing 50 is retained by the inner circumferential portion of the first holder 54.

The second bearing 52 is disposed between the outer shaft 48 and the second sub-housing 24. A hollow second holder 56 is inserted into the second sub-housing 24. The second bearing 52 is retained by the inner circumferential portion of the second holder 56.

The stator 40 surrounds the rotor 38. The stator 40 is accommodated in the accommodation chamber 202. The stator 40 includes electromagnetic coils 58. The electromagnetic coils 58 include three types of coils, including a U-phase coil, a V-phase coil, and a W-phase coil. In the case that the rotating electric machine 16 is an electrical power generator, the rotating electric machine 16 is a so-called three-phase power source.

The U-phase terminal 281 is electrically connected to the U-phase coil of the electromagnetic coils 58. The V-phase terminal 282 is electrically connected to the V-phase coil of the electromagnetic coils 58. The W-phase terminal 283 is electrically connected to the W-phase coil of the electromagnetic coils 58.

As shown in FIG. 1, an electrical component 60 is provided at the rotating electric machine housing 18. The electrical component 60 is, for example, an ECU, a PCU, an inverter, or the like. A current converter 62 provided in the rotating electric machine housing 18 is the electrical component 60. In the present embodiment, the electrical component 60 (the current converter 62) is disposed in the terminal casing 28. The position of the electrical component 60 is not limited to the inside of the terminal casing 28. For example, the electrical component 60 may be disposed between the terminal casing 28 and the internal combustion engine 14, on or in an outer circumferential portion 180 of the rotating electric machine housing 18.

As shown in FIG. 3, the current converter 62 includes a conversion circuit 64, a capacitor 66, and a control circuit 68. The conversion circuit 64, the capacitor 66, and the control circuit 68 are accommodated inside a device case 70.

The conversion circuit 64 includes a power module 72. The conversion circuit 64 converts AC currents (alternating currents) generated in the electromagnetic coils 58 into a DC current (direct current). At this time, the capacitor 66 temporarily stores as an electric charge the DC current converted by the conversion circuit 64. The conversion circuit 64 also possesses a function of converting a DC current delivered thereto from the battery 74 into an AC current. That is, the conversion circuit 64 is an inverter. In this case, the capacitor 66 temporarily stores the DC current delivered from the battery 74 toward the electromagnetic coils 58 as an electric charge.

The control circuit 68 controls a current density or the like of the DC current that flows from the capacitor 66 toward the battery 74, or the DC current that flows in the opposite direction. The control circuit 68 is an ECU or a PCU. Moreover, the DC current from the battery 74 is supplied to the motor, for example, via an AC-DC converter (neither of which are shown).

Figure 4:
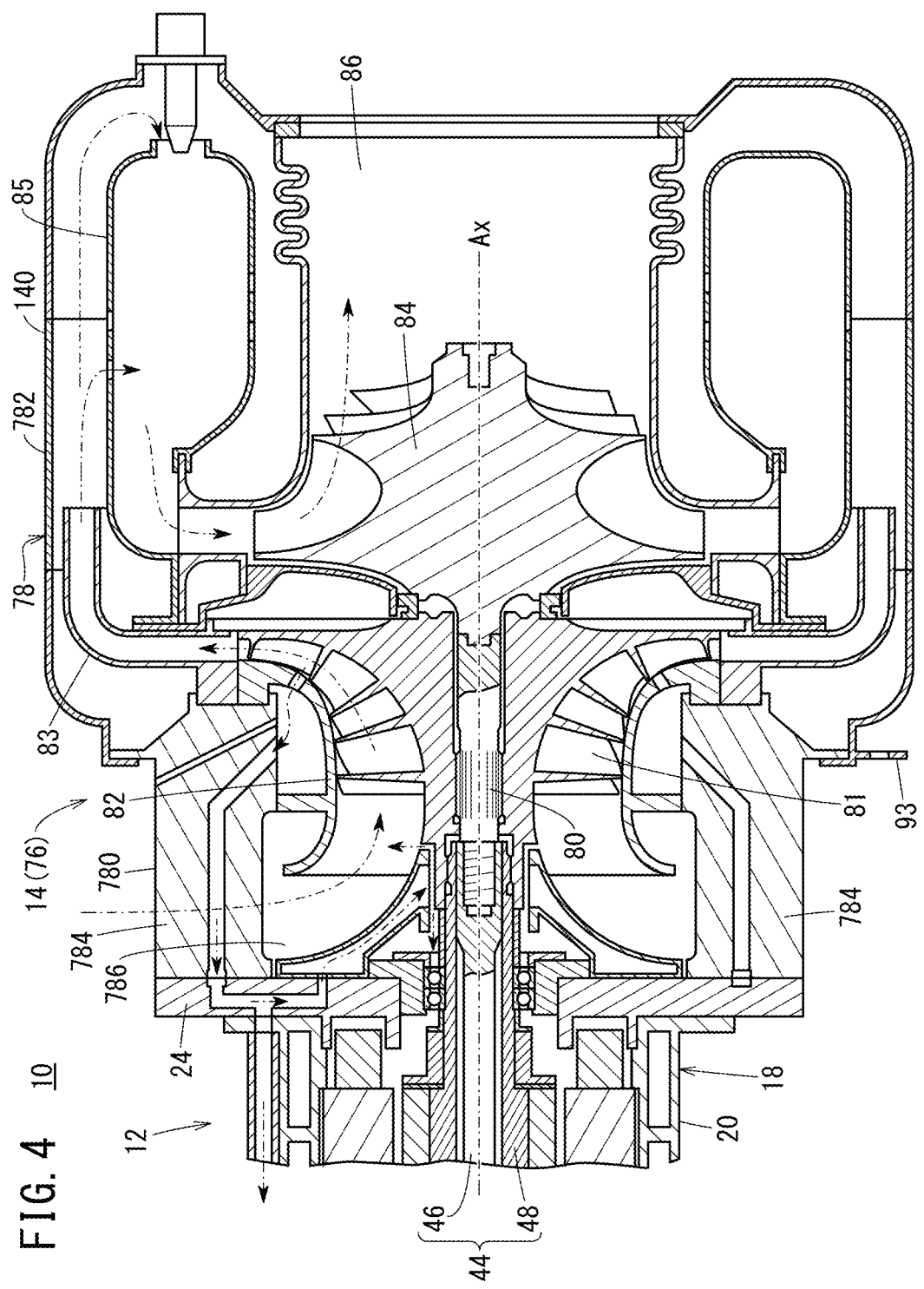
FIG. 4 is a cross-sectional view of an internal combustion engine in the combined power system.

In FIG. 1, the internal combustion engine 14 is a gas turbine engine 76. The internal combustion engine 14 may be a displacement type internal combustion engine (a reciprocating engine or a rotary engine). As shown in FIG. 4, the gas turbine engine 76 is equipped with an engine housing 78, an output shaft 80, a compressor wheel 81, a shroud case 82, a diffuser 83, a turbine wheel 84, a combustor 85, and a duct 86.

The engine housing 78 includes an inner housing 780 and an outer housing 782. The inner housing 780 is connected to the second sub-housing 24 of the rotating electric machine system 12. The outer housing 782 is connected to the inner housing 780. The outer housing 782 is a housing body constituting a main part of the engine housing 78. The inner housing 780 has a plurality of pillar portions 784 arranged at intervals in the circumferential direction. An air intake space 786 is formed between the pillar portions 784.

The output shaft 80 is coupled to the rotating shaft 44. One end of the output shaft 80 is screwed into an internal thread portion provided on the other end of the inner shaft 46. The shroud case 82 is inserted into the inner housing 780. The shroud case 82 is fixed to the inner housing 780. The shroud case 82 is a tubular member covering the compressor wheel 81. Air is introduced into the shroud case 82 from the air intake space 786.

The compressor wheel 81 and the turbine wheel 84 are supported on the output shaft 80. The compressor wheel 81 and the turbine wheel 84 are capable of rotating integrally together with the rotating shaft 44 and the output shaft 80.

The diffuser 83, the turbine wheel 84, the combustor 85 and the duct 86 are arranged within the outer housing 782. The diffuser 83 is fixed to the inner housing 780. The diffuser 83 surrounds the compressor wheel 81. The diffuser 83 introduces compressed air from the compressor wheel 81 and supplies the compressed air toward the combustor 85. The combustor 85 mixes the compressed air and fuel to generate combustion gas. The combustion gas is supplied to the turbine wheel 84. The combustion gas causes the turbine wheel 84 to rotate. The combustion gas that has passed through the turbine wheel 84 is discharged as exhaust gas via the duct 86.

As shown in FIG. 1, the rotating electric machine system 12 further includes a first retaining member 91 and a second retaining member 92. The first retaining member 91 and the second retaining member 92 are provided on the outer circumferential portion 180 of the rotating electric machine housing 18. The first retaining member 91 and the second retaining member 92 are constituent elements for retaining the rotating electric machine housing 18 by first support member 110 (see FIG. 5) provided in the structural body 100 in which the rotating electric machine system 12 is installed. The first retaining member 91 and the second retaining member 92 project radially outward from an outer circumferential surface 182 of the rotating electric machine housing 18 curved in an arc shape. The arc-shaped outer circumferential surface 182 is a part of the outer circumferential portion 180 of the rotating electric machine housing 18.

The first retaining member 91 and the second retaining member 92 are arranged at positions spaced from each other in the circumferential direction of the rotating electric machine housing 18. In the relative positional relationship between the first retaining member 91 and the second retaining member 92, the first retaining member 91 is disposed at a relatively lower position, and the second retaining member 92 is disposed at a relatively higher position.

Figure 5:
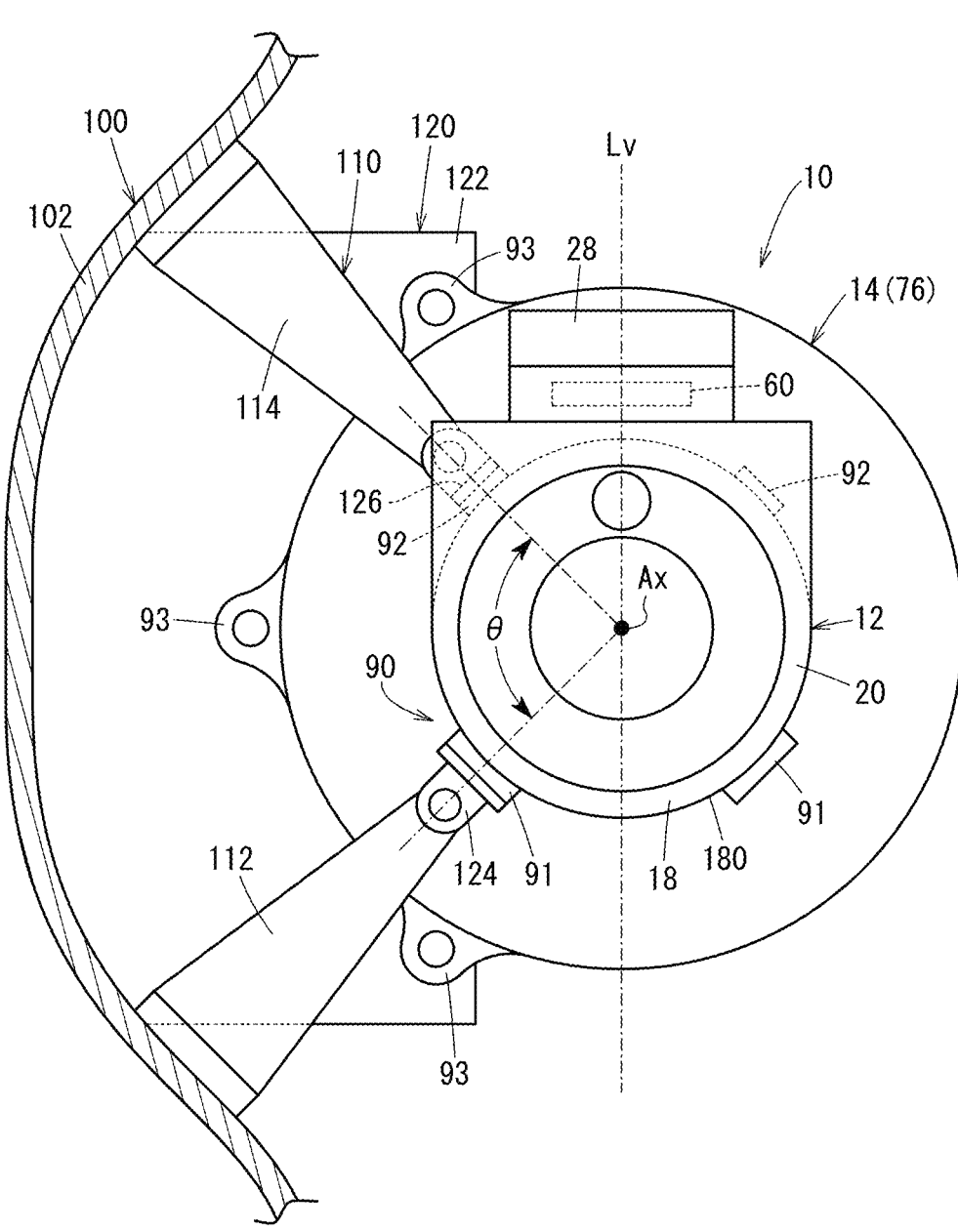
FIG. 5 is a schematic diagram illustrating an arrangement configuration of a structural body of the combined power system.

As shown in FIG. 5, the single first retaining member 91 and the single second retaining member 92 constitute a pair of rotating electric machine retaining members 90, and the two pairs of rotating electric machine retaining members 90 are disposed line-symmetrically with respect to a virtual reference line Lv perpendicular to the axis of the rotor 38 (the axis Ax of the rotating electric machine system 12). In FIG. 5, the virtual reference line Lv is a vertical line that intersects the axis Ax of the rotor 38.

The first retaining member 91 is disposed at a position lower than the axis Ax of the rotor 38. The second retaining member 92 is disposed at a position higher than the axis Ax of the rotor 38. A separation angle $\theta$ between the first retaining member 91 and the second retaining member 92 of each pair of the rotating electric machine retaining members 90 with respect to the axis Ax of the rotor 38 is, for example, 120° or less. The separation angle $\theta$ is, for example, 100° or less. The separation angle $\theta$ is, for example, 30° or more. The separation angle $\theta$ is, for example, 60° or more.

Such a separation angle $\theta$ is preferably 85° to 95°. In FIG. 5, the separation angle $\theta$ is approximately 90°. The separation angle $\theta$ is an angle between the center position of the first retaining member 91 and the center position of the second retaining member 92 with the axis Ax of the rotor 38 as the center when viewed from the axial direction of the rotating electric machine system 12.

As shown in FIG. 1, the first retaining member 91 and the second retaining member 92 are disposed at positions spaced from each other in the axial direction of the rotating electric machine system 12. Specifically, as shown in FIG. 2, the first retaining member 91 is disposed in a part of the outer circumferential portion 180 of the rotating electric machine housing 18, which is a part of the rotating electric machine housing 18 that surrounds the first small diameter portion 441 of the rotating shaft 44. The first retaining member 91 and the terminal casing 28 are arranged on substantially the same circumference. That is, the region where the first retaining member 91 is disposed overlaps the region where the terminal casing 28 is disposed in relation to the position of the rotating electric machine system 12 in the axial direction.

The second retaining member 92 is disposed between the first retaining member 91 and the second bearing 52 in the axial direction. The second retaining member 92 is disposed between the terminal casing 28 and the second bearing 52 in the axial direction. The second retaining member 92 is disposed at a part of the outer circumferential portion 180 of the rotating electric machine housing 18, which is a part of the rotating electric machine housing 18 that surrounds the permanent magnets 42.

In the following description, a direction (X1 direction) from the second bearing 52 to the first bearing 50 is referred to as a "first axial direction". A direction (X2 direction) from the first bearing 50 to the second bearing 52 is referred to as a "second axial direction".

A separation distance L between the first retaining member 91 and the second retaining member 92 in the axial direction is equal to or less than the length in the axial direction of the first retaining member 91 or the second retaining member 92, whichever is the larger in the axial direction. The separation distance L is a distance in the axial direction between the end of the first retaining member 91 in the second direction and the end of the second retaining member 92 in the first direction. In the present embodiment, the first retaining member 91 is larger in the axial direction than the second retaining member 92. The second retaining member 92 may be larger than the first retaining member 91 in the axial direction. The first retaining member 91 and the second retaining member 92 may have the same size in the axial direction.

As shown in FIG. 1, the electrical component 60 is disposed at a position away from the portion between the first retaining member 91 and the second retaining member 92 in the outer circumferential portion 180 of the rotating electric machine housing 18. The arrangement configuration of the electrical component 60 with respect to the first retaining member 91 and the second retaining member 92 satisfies at least one of following first and second conditions. Hereinafter, the arrangement configuration of the electrical component 60 with respect to the first retaining member 91 and the second retaining member 92 is simply referred to as the "arrangement configuration of the electrical component 60".

In the first condition, the electrical component 60 is disposed at a position shifted in the circumferential direction with respect to the circumferential region from the first retaining member 91 to the second retaining member 92. In the second condition, the electrical component 60 is disposed at a position shifted in the axial direction with respect to the axial regions from the first retaining member 91 to the second retaining member 92. In the present embodiment, the arrangement configuration of the electrical component 60 satisfies the first condition, but does not satisfy the second condition. In another embodiment, the arrangement configuration of the electrical component 60 may satisfy the second condition, but need not satisfy the first condition. The arrangement configuration of the electrical component 60 may satisfy both the first condition and the second condition.

The combined power system 10 further includes a plurality of third retaining members 93. The plurality of third retaining members 93 are provided at intervals on an outer circumferential portion 140 of the internal combustion engine 14. The plurality of third retaining members 93 are constituent elements for retaining the internal combustion engine 14 by a second support member 120 (FIG. 5) provided in the structural body 100. The plurality of third retaining members 93 are provided at positions axially displaced from the combustor 85. Specifically, the plurality of third retaining members 93 project radially outward from the outer surface of the distal end portion of the outer housing 782. The plurality of third retaining members 93 are arranged on a common virtual circle centered on the axis Ax of the rotor 38.

As shown in FIG. 5, the circumferential positions of the plurality of third retaining members 93 can be appropriately changed according to the installation configuration in the structural body 100, which is the object in or on which the combined power system 10 is disposed. The combined power system 10 is installed on a frame 102 extending in the up-down direction in the structural body 100 through the first support member 110 and the second support member 120. The structural body 100 is, for example, an aircraft (flying object). The plurality of third retaining members 93 are disposed at positions (on the left side of the internal combustion engine 14 in FIG. 5) that are on one side in the horizontal direction with respect to the axis Ax of the combined power system 10 so as to be suitable for the installation configuration as shown in FIG. 5.

The first support member 110 has a first stay 112 and a second stay 114. One end of each of the first stay 112 and the second stay 114 is fixed to the frame 102. The other end of the first stay 112 is fixed to the first retaining member 91 via a first bracket 124. The other end of the second stay 114 is fixed to the second retaining member 92 through a second bracket 126. The first bracket 124 and the second bracket 126 are fixed to the first retaining member 91 and the second retaining member 92, respectively, by appropriate fasteners (bolts, etc.).

In FIG. 5, the second support member 120 is a single third stay 122. One end of the third stay 122 is fixed to the frame 102 of the structural body 100. The other end of the third stay 122 is fixed to the plurality of third retaining members 93 by an appropriate fasteners (bolts or the like).

The present embodiment exhibits the following advantageous effects.

As shown in FIG. 1, the rotating electric machine system 12 includes the first retaining member 91 and the second retaining member 92. The first retaining member 91 and the second retaining member 92 are arranged at positions spaced from each other in the circumferential direction of the rotating electric machine housing 18. The electrical component 60 is disposed at a position on the outer circumferential portion 180 of the rotating electric machine housing 18, the position being separated from the portion between the first retaining member 91 and the second retaining member 92.

Therefore, in FIG. 5, even when the structural body 100 in which the rotating electric machine system 12 is installed is struck by lightning and a part of the current flows to the rotating electric machine system 12, the current flows to a portion away from the electrical component 60, so that the electrical component 60 can be prevented from being damaged. That is, even when a current flows from the structural body 100 to the rotating electric machine system 12 through the first support member 110, the current flows through the portion between the first retaining member 91 and the second retaining member 92 in the outer circumferential portion 180 of the rotating electric machine housing 18. Therefore, the electrical component 60 can be protected from the current caused by the lightning.

The separation angle θ between the first retaining member 91 and the second retaining member 92 with respect to the axis Ax of the rotor 38 is within 120°. In accordance with such a configuration, even when the structural body 100 in which the rotating electric machine system 12 is installed is struck by lightning and a part of the current flows through the rotating electric machine system 12, the current pathway between the first retaining member 91 and the second retaining member 92 can be further limited. Therefore, it is possible to prevent damage to the electrical component 60 more effectively when struck by lightning.

The separation angle θ between the first retaining member 91 and the second retaining member 92 with respect to the axis Ax of the rotor 38 is 100° or less. In accordance with such a configuration, even when the structural body 100 in which the rotating electric machine system 12 is installed is struck by lightning and a part of the current flows through the rotating electric machine system 12, the current pathway between the first retaining member 91 and the second retaining member 92 can be short. Therefore, it is possible to prevent damage to the electrical component 60 more effectively when struck by lightning.

In FIG. 2, the separation distance L between the first retaining member 91 and the second retaining member 92 in the axial direction of the rotor 38 is equal to or less than the length in the axial direction of the first retaining member 91 or the second retaining member 92, whichever is larger in the axial direction. In accordance with such a configuration, the rotating electric machine system 12 can be well supported by the first retaining member 91 and the second retaining member 92 having the short separation distance L from each other in the axial direction.

The rotating shaft 44 has the large diameter portion 440 for supporting the permanent magnets 42, and the first small diameter portion 441 and the second small diameter portion 442 projecting from the large diameter portion 440 in mutually opposite directions in the axial direction of the rotor 38. The first retaining member 91 is disposed in a portion of the outer circumferential portion 180 of the rotating electric machine housing 18 and surrounding the first small diameter portion 441 of the rotating electric machine housing 18. In accordance with such a configuration, since the first retaining member 91 is disposed in the vicinity of the source of vibration, the vibration of the rotating shaft 44 can be effectively suppressed.

The second retaining member 92 is disposed between the first retaining member 91 and the second bearing 52 in the axial direction. The separation distance L between the first retaining member 91 and the second retaining member 92 in the axial direction of the rotor 38 is equal to or less than the length in the axial direction of the first retaining member 91 or the second retaining member 92, whichever is larger in the axial direction. In accordance with such a configuration, since the second retaining member 92 is disposed in the vicinity of the source of vibration, the vibration of the rotating shaft 44 can be effectively suppressed.

In FIG. 5, the first retaining member 91 and the second retaining member 92 are defined as a pair of rotating electric machine retaining members 90, and the two pairs of rotating electric machine retaining members 90 are disposed in line symmetry with respect to a virtual reference line Lv perpendicular to the axis Ax of the rotor 38. In accordance with such a configuration, since the two pairs of the rotating electric machine retaining members 90 are disposed in line symmetry, the freedom of the installation location of the rotating electric machine system 12 with respect to the structural body 100 is increased.

In FIG. 1, the combined power system 10 includes the rotating electric machine system 12 and the internal combustion engine 14. The plurality of third retaining members 93 are provided at intervals on the outer circumferential portion 140 of the internal combustion engine 14. The plurality of third retaining members 93 are provided at positions axially displaced from the combustor 85. In accordance with such a configuration, the combined power system 10 including the rotating electric machine system 12 and the internal combustion engine 14 can be supported in a good manner. Further, since the plurality of third retaining members 93 are provided at positions axially shifted from the combustor 85 on the outer circumferential portion 140 of the internal combustion engine 14, the amount of heat transfer from the internal combustion engine 14 can be minimized to maintain the internal combustion engine 14 in a sound state.

The plurality of third retaining members 93 are disposed on a common virtual circle centered on the axis Ax of the internal combustion engine 14. In accordance with such a configuration, the internal combustion engine 14 can be well supported by the plurality of third retaining members 93 disposed on the common virtual circle, and the vibration of the combined power system 10 can be effectively suppressed.

Figure 6:
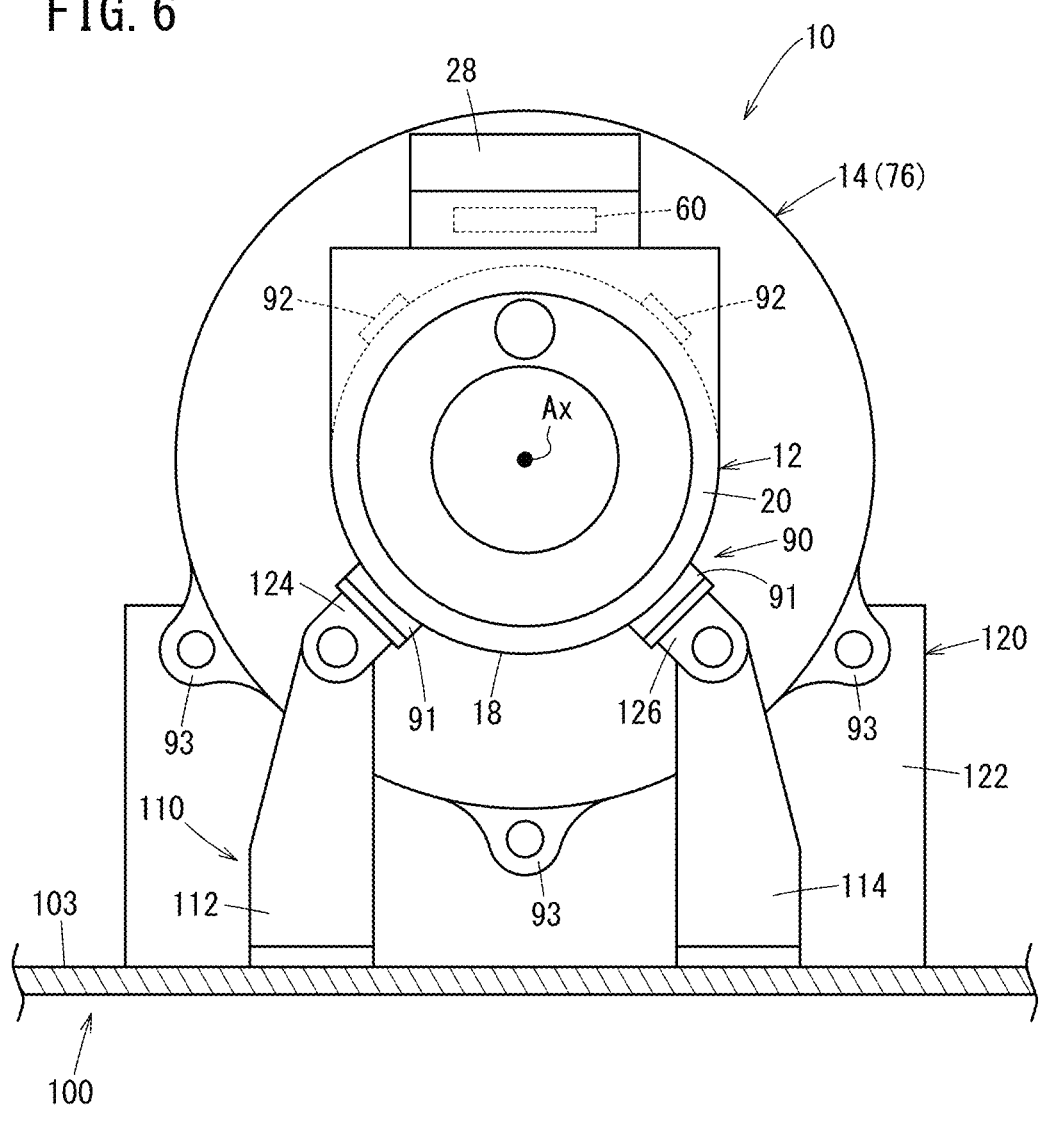
FIG. 6 is a schematic diagram illustrating another arrangement configuration of the structural body of the combined power system.

As shown in FIG. 6, the combined power system 10 may be mounted on a floor 103 of the structural body 100 via the first support member 110 and the second support member 120. In this case, the first stay 112 of the first support member 110 is fixed to one of the first retaining members 91, and the second stay 114 is fixed to the other of the first retaining members 91. The plurality of third retaining members 93 are disposed below the axis Ax of the combined power system 10 so as to be suitable for the installation configuration as shown in FIG. 6. As another installation configuration, the combined power system 10 may be suspended from the ceiling of the structural body 100 through the first support member 110 and the second support member 120.

The following supplementary notes are further disclosed in relation to the above-described embodiments.

Supplementary Note 1

The rotating electric machine system (12) according to the present disclosure is equipped with the rotating electric machine (16) provided with the rotor (38), the rotor including the permanent magnet (42) and the rotating shaft (44), and the rotating electric machine housing (18) configured to rotatably support the rotating shaft. The rotating electric machine system includes the electrical component (60) provided at the rotating electric machine housing, and the first retaining member (91) and the second retaining member (92) provided on the outer circumferential portion (180) of the rotating electric machine housing and configured to retain the rotating electric machine housing by the support member provided in the structural body (100) to which the rotating electric machine system is installed, wherein the first retaining member and the second retaining member are arranged at the positions spaced from each other in the circumferential direction of the rotating electric machine housing, and the electrical component is disposed at the position away from the portion between the first retaining member and the second retaining member in the outer circumferential portion.

Supplementary Note 2

In the rotating electric machine system according to the supplementary note 1, the separation angle (θ) by which the first retaining member and the second retaining member are separated from each other about the axis (Ax) of the rotor, may be 120° or less.

Supplementary Note 3

In the rotating electric machine system according to the supplementary note 2, the separation angle may be 100° or less.

Supplementary Note 4

In the rotating electric machine system according to the supplementary note 1 or 2, the separation distance (L) between the first retaining member and the second retaining member in the axial direction of the rotor may be equal to or less than the length in the axial direction of the first retaining member or the second retaining member, whichever is larger in the axial direction.

Supplementary Note 5

In the rotating electric machine system according to any one of the supplementary notes 1 to 4, the rotating shaft may include the large diameter portion (440) configured to support the permanent magnet, and the first small diameter portion (441) and the second small diameter portion (442) projecting from the large diameter portion in respective directions opposite to each other in the axial direction of the rotor, the first bearing (50) may be disposed between the rotating electric machine housing and the first small diameter portion, the second bearing (52) may be disposed between the rotating electric machine housing and the second small diameter portion, and the first retaining member may be disposed in a part of the outer circumferential portion, which is the part of the rotating electric machine housing that surrounds the first small diameter portion.

Supplementary Note 6

In the rotating electric machine system according to the supplementary note 5, the second retaining member may be disposed at the position between the first retaining member and the second bearing in the axial direction, and the separation distance between the first retaining member and the second retaining member in the axial direction may be equal to or less than the length in the axial direction of the first retaining member of the second retaining member, whichever is larger in the axial direction.

Supplementary Note 7

In the rotating electric machine system according to the supplementary note 6, the second retaining member may be disposed in a part of the outer circumferential portion, which is the part of the rotating electric machine housing that surrounds the permanent magnet.

Supplementary Note 8

In the rotating electric machine system according to any one of the supplementary notes 1 to 7, the first retaining member and the second retaining member may be defined as the pair of rotating electric machine retaining members (90), and two pairs of the rotating electric machine retaining members may be disposed in line symmetry with respect to the virtual reference line (Lv) perpendicular to the axis of the rotor.

Supplementary Note 9

The combined power system (10) according to the present disclosure is equipped with the rotating electric machine system according to any one of the supplementary notes 1 to 8, and the internal combustion engine (14) including the combustor (85) and the output shaft (80) that is configured to rotate integrally together with the rotating shaft. The combined power system includes the plurality of third retaining members (93) provided at intervals on the outer circumferential portion (140) of the internal combustion engine and configured to retain the internal combustion engine by another support member provided in the structural body, wherein the plurality of third retaining members are provided at the positions shifted from the combustor in the axial direction of the internal combustion engine.

Supplementary Note 10

In the combined power system according to the supplementary note 9, the plurality of third retaining members may be arranged on the common virtual circle centered on the axis (Ax) of the internal combustion engine.

While the present disclosure has been described in detail, the present disclosure is not limited to the individual embodiments described above. Within a range that does not depart from the essence and gist of the present disclosure, or within a range that does not depart from the gist and essence of the present disclosure derived from the content described in the claims and equivalents thereof, various additions, substitutions, changes, partial deletions, or the like can be made to such embodiments. These embodiments may also be implemented in combination. For example, in the embodiments described above, the order of each of the operations and the order of each of the processes are shown as examples, and the present invention is not limited to such operations and processes. The same applies to the case where numerical values or mathematical expressions are used in the description of the above-described embodiments.

The invention claimed is:

1. A rotating electric machine system equipped with: a rotating electric machine provided with a rotor, the rotor including a permanent magnet and a rotating shaft; and a rotating electric machine housing configured to rotatably support the rotating shaft, the rotating electric machine system comprising:

an electrical component provided at the rotating electric machine housing; and a first retaining member and a second retaining member provided on an outer circumferential portion of the rotating electric machine housing and configured to retain the rotating electric machine housing by a support member provided in a structural body to which the rotating electric machine system is installed, wherein the first retaining member and the second retaining member are arranged at positions spaced from each other in a circumferential direction of the rotating electric machine housing and are arranged at positions spaced from each other in an axial direction of the rotor, and the electrical component is disposed at a position away from a portion between the first retaining member and the second retaining member in the outer circumferential portion.

2. The rotating electric machine system according to claim 1, wherein a separation angle by which the first retaining member and the second retaining member are separated from each other about an axis of the rotor, is 120° or less.

3. The rotating electric machine system according to claim 2, wherein the separation angle is 100° or less.

4. The rotating electric machine system according to claim 1, wherein a separation distance between the first retaining member and the second retaining member in the axial direction of the rotor is equal to or less than a length in the axial direction of the first retaining member or the second retaining member, whichever is larger in the axial direction.

5. The rotating electric machine system according to claim 1, wherein the first retaining member and the second retaining member are defined as a pair of rotating electric machine retaining members, and two pairs of the rotating electric machine retaining members are disposed in line symmetry with respect to a virtual reference line perpendicular to an axis of the rotor.

6. The rotating electric machine system according to claim 1, wherein
the first retaining member and the second retaining member have different sizes in the axial direction of the rotor.

7. The rotating electric machine system according to claim 1, wherein
at least one of the first retaining member or the second retaining member is disposed in a part of the outer circumferential portion that is a part of the rotating electric machine housing that surrounds the permanent magnet.

8. The rotating electric machine system according to claim 1, wherein
in the axial direction, the first retaining member is disposed at a position overlapping the electrical component, and
when viewed from the axial direction, the electrical component is disposed on an opposite side of an axial line of the rotor from the first retaining member.

9. A rotating electric machine system equipped with: a rotating electric machine provided with a rotor, the rotor including a permanent magnet and a rotating shaft; and a rotating electric machine housing configured to rotatably support the rotating shaft, the rotating electric machine system comprising:
an electrical component provided at the rotating electric machine housing; and
a first retaining member and a second retaining member provided on an outer circumferential portion of the rotating electric machine housing and configured to retain the rotating electric machine housing by a support member provided in a structural body to which the rotating electric machine system is installed,
wherein the first retaining member and the second retaining member are arranged at positions spaced from each other in a circumferential direction of the rotating electric machine housing, and
the electrical component is disposed at a position away from a portion between the first retaining member and the second retaining member in the outer circumferential portion,
the rotating shaft includes a large diameter portion configured to support the permanent magnet, and a first small diameter portion and a second small diameter portion projecting from the large diameter portion in respective directions opposite to each other in an axial direction of the rotor,
a first bearing is disposed between the rotating electric machine housing and the first small diameter portion,
a second bearing is disposed between the rotating electric machine housing and the second small diameter portion, and the first retaining member is disposed in a part of the outer circumferential portion, which is a part of the rotating electric machine housing that surrounds the first small diameter portion.

10. The rotating electric machine system according to claim 9, wherein the second retaining member is disposed at a position between the first retaining member and the second bearing in the axial direction, and
a separation distance between the first retaining member and the second retaining member in the axial direction is equal to or less than a length in the axial direction of the first retaining member or the second retaining member, whichever is larger in the axial direction.

11. The rotating electric machine system according to claim 10, wherein the second retaining member is disposed in a part of the outer circumferential portion, which is a part of the rotating electric machine housing that surrounds the permanent magnet.

12. A combined power system equipped with:
a rotating electric machine system; and
an internal combustion engine
wherein
the rotating electric machine system is equipped with:
a rotating electric machine provided with a rotor, the rotor including a permanent magnet and a rotating shaft;
a rotating electric machine housing configured to rotatably support the rotating shaft;
an electrical component provided at the rotating electric machine housing; and
a first retaining member and a second retaining member provided on an outer circumferential portion of the rotating electric machine housing and configured to retain the rotating electric machine housing by a support member provided in a structural body to which the rotating electric machine system is installed,
the first retaining member and the second retaining member are arranged at positions spaced from each other in a circumferential direction of the rotating electric machine housing,
the electrical component is disposed at a position away from a portion between the first retaining member and the second retaining member in the outer circumferential portion,
the internal combustion engine includes a combustor and an output shaft that is configured to rotate integrally together with the rotating shaft,
the combined power system comprises a plurality of third retaining members provided at intervals on an outer circumferential portion of the internal combustion engine and configured to retain the internal combustion engine by another support member provided in the structural body, and
the plurality of third retaining members are provided at positions shifted from the combustor in an axial direction of the internal combustion engine.

13. The combined power system according to claim 12, wherein the plurality of third retaining members are arranged on a common virtual circle centered on an axis of the internal combustion engine.

* * * * *